United States Patent
Braunecker et al.

(10) Patent No.: US 8,331,624 B2
(45) Date of Patent: Dec. 11, 2012

(54) METHOD AND GEODETIC DEVICE FOR SURVEYING AT LEAST ONE TARGET

(75) Inventors: Bernhard Braunecker, Rebstein (CH); Marcel Rohner, Heiden (CH)

(73) Assignee: Leica Geosystems AG, Heerbrugg (CH)

( * ) Notice: Subject to any disclaimer, the term of this patent is extended or adjusted under 35 U.S.C. 154(b) by 865 days.

(21) Appl. No.: 11/813,981

(22) PCT Filed: Jan. 12, 2006

(86) PCT No.: PCT/EP2006/050177
§ 371 (c)(1),
(2), (4) Date: Aug. 20, 2007

(87) PCT Pub. No.: WO2006/075017
PCT Pub. Date: Jul. 20, 2006

(65) Prior Publication Data
US 2008/0205707 A1 Aug. 28, 2008

(30) Foreign Application Priority Data
Jan. 14, 2005 (EP) .................................. 05000656

(51) Int. Cl.
*G06K 9/00* (2006.01)
(52) U.S. Cl. ........................................ 382/106; 382/109
(58) Field of Classification Search .................. 382/286, 382/195, 106, 154; 348/135, 141, 348; 364/578, 364/560
See application file for complete search history.

(56) References Cited

U.S. PATENT DOCUMENTS

| | | | |
|---|---|---|---|
| 5,844,231 A | 12/1998 | Suzuki et al. | |
| 5,988,862 A * | 11/1999 | Kacyra et al. | 703/6 |
| 6,433,858 B1 | 8/2002 | Suzuki | |
| 6,504,602 B1 * | 1/2003 | Hinderling | 356/5.1 |
| 6,559,931 B2 * | 5/2003 | Kawamura et al. | 356/4.01 |
| 6,707,995 B1 | 3/2004 | Ichikawa et al. | |
| 6,731,329 B1 | 5/2004 | Feist et al. | |
| 7,030,969 B2 * | 4/2006 | Giger | 356/5.02 |
| 7,081,917 B2 * | 7/2006 | Shimoyama et al. | 348/135 |
| 7,184,088 B1 * | 2/2007 | Ball | 348/348 |
| 7,274,802 B2 * | 9/2007 | Kumagai et al. | 382/106 |

(Continued)

FOREIGN PATENT DOCUMENTS

DE 42 10 245 9/1993
(Continued)

OTHER PUBLICATIONS

Japanese office action dated Aug. 24, 2011 as received in related application No. 2007-550792.

*Primary Examiner* — Chan S Park
*Assistant Examiner* — Nancy Bitar
(74) *Attorney, Agent, or Firm* — Maschoff Gilmore & Israelsen

(57) ABSTRACT

The invention relates to a method for surveying at least one target using a geodetic device. According to said method, a camera of the device captures a visual image and surveys an angle and/or a distance to the target with geodetic precision, the angle and/or distance surveillance being supported or controlled by the visual image. At the same time of capture of the visual image at least two distance points of a distance image are captured as the spatial distribution of discrete distance points in the area of detection. When the visual image and the distance image are correlated with each other, the target is recognized or the measuring process is controlled.

19 Claims, 3 Drawing Sheets

U.S. PATENT DOCUMENTS

| | | | |
|---|---|---|---|
| 7,633,610 B2 * | 12/2009 | Walser | 356/141.5 |
| 7,659,509 B2 * | 2/2010 | Workman et al. | 250/310 |
| 7,930,835 B2 * | 4/2011 | Svanholm et al. | 33/290 |
| 2001/0008423 A1 | 7/2001 | Nakamura | |
| 2003/0048438 A1 | 3/2003 | Kawamura et al. | |

FOREIGN PATENT DOCUMENTS

| | | |
|---|---|---|
| EP | 1 314 959 | 5/2003 |
| GB | 2 353 862 B | 12/2002 |
| JP | 9-304058 A | 11/1997 |
| JP | 2000-121919 A | 4/2000 |
| JP | 2000-337815 A | 12/2000 |
| JP | 2001-194576 A | 7/2001 |
| JP | 2001-264624 A | 9/2001 |
| JP | 2001-296124 A | 10/2001 |
| JP | 2003-279352 A | 10/2003 |
| JP | 2004-109473 A | 4/2004 |
| JP | 2004-264451 A | 9/2004 |
| WO | WO 00/25089 | 5/2000 |
| WO | WO 2004/036145 | 4/2004 |

\* cited by examiner

METHOD AND GEODETIC DEVICE FOR SURVEYING AT LEAST ONE TARGET

The invention relates to a method for surveying at least one target, a geodetic device and a computer program product.

BACKGROUND

Since antiquity, a multiplicity of measuring apparatuses have been known for recording properties of defined points in a measuring environment, in particular of spatial data. The location of a measuring device together with any reference points present, and direction, distance and angle to targets and measuring points, are recorded as standard spatial data.

A generally known example of such measuring apparatuses is the theodolite. An overview of geodetic measuring apparatuses of the prior art is provided by "Elektronische Entfernungs- und Richtungsmessung" [Electronic distance and direction measurement] by R. Joeckel and M. Stober, 4th edition, Verlag Konrad Wittwer, Stuttgart 1999 and "Electronic Distance Measurement" by J. M. Rüeger, 4th edition, Springer-Verlag, Berlin, Heidelberg 1996.

For controlling the measuring process, devices with camera/screen combinations which permit ergonomically advantageous use are also increasingly being used in addition to systems having an eyepiece. In addition, target identification or target tracking and hence facilitation and automation of the surveying process can be effected by the recording of an optical image.

Thus, for example, EP 1 314 959 and WO 2004/036145 disclose geodetic measuring devices having an electronic display and control apparatus, which permit screen-based operation.

In the two-dimensional representation of the optical image, it is possible to specify the points to which a measurement, i.e. the determination of distance and/or angle is made. On the basis of the image, targets can be identified and tracked by image processing methods, so that automated surveying is possible on this basis.

However, this image has no depth information at all, so that the image processing methods are reliant on appropriate preliminary information, image-recording conditions, such as, for example, the pre-alignment of a target plate, or image properties, such as, for example, brightness and contrast. The possibilities for target identification and tracking are limited by the purely visual capture. In particular, optical ambiguities as occur, for example, in the case of curved surfaces cannot be resolved. Thus, in a frontal recording under unfavourable light conditions, a disc and a sphere appear as an identical image in both cases.

The recording of purely visual images thus limits the control and automation of measuring processes in terms of the environmental conditions and target geometries.

For the production of topographies as static images with depth information, images of the Earth's surface or a celestial body are recorded from at least two different angles in aerial photogrammetry during a camera flight or a recording movement, from which images height information, for example for the preparation of map material, can be calculated on the basis of the collinearity relationship. In modern implementations of this method, photographs are digitized by scanning for electronic further processing or are digitally recorded during the flight itself.

EP 1 418 401 discloses a method and an apparatus for aerial or space photogrammetry, in which distance measurements to sampling points are additionally carried out using laser beams of a laser rangefinder during a camera flight with an aircraft for recording images which can be used in photogrammetry. The distance measurements are recorded in each case for a set of image points and later used as constraints for the preparation of a topography of the surface. Recorded distance measurements can moreover be used for optimizing the recording and flight parameters.

During the production of aerial images, preferably using a multiline sensor camera, distance measurements to sampling points which in each case are coordinated with a set of at least one image point are additionally carried out here for the recording of image points. These distance measurements are effected with laser rangefinders.

An alternative to conventional photogrammetry has arisen through the direct distance measurement from the aircraft to individual points by means of laser-based distance measurement (LIDAR). However, this method is not capable of providing further information to a comparable extent, for example in different spectral ranges. In addition, the image recording is effected by scanning, i.e. sequentially so that it is not suitable in applications for which rapid availability of image information is decisive.

Moreover, LIDAR systems having a scanning beam have disadvantages which result from the mechanical design. Either the entire device has to be moved over the visual region to be recorded or the beam guidance must be designed to be variable in an otherwise invariable apparatus. In addition to the expense of such mechanically and/or optically demanding or complex solutions, they generally have only a low scanning speed and in addition have a comparatively high energy consumption.

Systems which are based on sequential capture of additional depth or distance information moreover have problems of mechanical stability. Owing to the scanning movement and mechanical loads, for example due to vibration, the correlation of the distance measurements with the image points of the visual image is not ensured or is ensured only at additional expense.

SUMMARY

The object of the present invention is to provide a method and an apparatus for geodetic surveying, which permits improved target recognition.

A further object is to improve the control of the measuring process for a geodetic device of the generic type.

The invention is based on the concept of obtaining further depth information over the capture region of the visual image by additional distance measurements between recording system and surface, which further depth information can be used for controlling the measuring process and for target recognition.

In a wider sense, the invention relates to all geodetic devices which are optically aligned with measuring points by visual alignment means or support such alignment. In this context, the term "geodetic device" is generally intended always to mean a measuring instrument which has apparatuses for measuring or checking spatial data. In particular, this relates to the measurement of distance and/or direction or angles to a reference point or measuring point. In addition, however, further apparatuses, e.g. components for satellite-supported position determination (for example GPS, GLONASS or GALILEO), may also be present, which can be used for supplementary measurements or data recordings. In particular, such a geodetic measuring device is to be understood here as meaning theodolites and also so-called total stations as tacheometers with electronic angle measurement and electrooptical rangefinder.

Equally, the invention is suitable for use in specialised apparatuses having a similar functionality, e.g. in military aiming circles or in the monitoring of industrial structures or processes; these systems are hereby likewise covered by the term "geodetic device".

According to the invention, a further component which is formed for recording distance measurements to selected points or with defined orientations within the area of capture of the visual channel is integrated into a geodetic device having a camera. The distances recorded by this component are correlated with points in the image of the visual channel so that information can be derived via the structures visible in the visual image.

For example, CCD or CMOS cameras are suitable apparatuses which capture an image having a multiplicity of image points and are available as recording components of the visual image.

Various alternatives are available as means for recording distances. Firstly measurements can be carried out by a plurality of separate rangefinders simultaneously to all points or to a plurality of points in the area of capture in groups in cohesion as a function of time, i.e. directly in succession, it being necessary to adjust the individual rangefinders with regard to the image points. Secondly, integrated solutions, e.g. chips as two-dimensional arrangements of individual sensors with integrated distance-measuring functionality, are also available. Such Range Imaging Modules (RIM) have, for example, 32×32 sensors in a matrix arrangement. By means of this matrix, a distance image can be recorded as a spatial distribution of discrete distance points in the area of capture. It is true that, with this number of sensor points and hence distance image points, the lateral resolution is not sufficient for performing precise control and identification tasks on the basis of the distance image alone. By combination with the visual image, however, the required depth information can be made available for this. For example, the visual and the distance image can be superposed logically or optically so that, for individual image points or groups of image points, their spacing or their average distance to the device is also known.

Here, distance image is understood as meaning a two-dimensional arrangement of measured distance values which cover at least a part of the area of capture of the camera with the cohesion necessary for control or target recognition. Different levels of cohesion, for example, for successive steps of target recognition with increasing accuracy, can also be used. It may be sufficient if only a single distance value is recorded for an image point or a group of image points. In many cases, however, identifiable cohesive structures in the distance image permit matching with structures of the visual image so that objects in the area of capture can be identified and can be classified with respect to the distance or the sequence in the area of capture.

The implementation of the method on the apparatus side can be effected both with the use of separate components for distance measurement and image recording and with integration of both functions into individual components. The distance measurement carried out with the distance measuring points from a predetermined reference point in the device to a distance point in the area of capture must be capable of being related to the visual image recording so that various orientations and arrangements of the different components are possible as long as this condition is fulfilled. The reference point defining the distance measurement is generally determined by the design and the arrangement of the component recording the distance image in the device.

The distance points recorded by the means for recording a distance image or the orientation of the axes of the distance measurements can be distributed randomly or with a specific pattern within the area of capture of the visual image. Since in general only parts of the area of capture have to be more greatly resolved for target recognition and/or survey control, the position and density of the distance points may also be variable. Consequently, stepped methods are also possible, in which first a visual or distance image-based coarse search run or coarse sighting is effected, followed by the higher resolution in a smaller area. For this purpose, beam-modifying components, for example, arrays of microlenses or holograms, can be introduced, for example, into the beam path before the means for recording a distance image. Alternatively or in addition, however, the means itself can be moved within the beam path. Examples for realising a movement of components relative to the beam path inside the device or for varying the emission and reception direction in an otherwise unchanged area of capture of the optical system are described in WO 2004/036145.

The choice of the arrangement of distance points to be recorded can also be controlled on the basis of distance information. Thus, for example, in a first step, a distance image of the total area of capture can be recorded. In this distance image, regions with particularly great variance of the recorded distances are subsequently identified and are recorded with high resolution and analyzed in a second step.

BRIEF DESCRIPTION OF THE DRAWINGS

The method according to the invention and a device according to the invention are described or explained in more detail purely by way of example below with reference to working examples shown schematically in the drawing. Specifically.

DETAILED DESCRIPTION OF THE DRAWINGS

Figure 1:
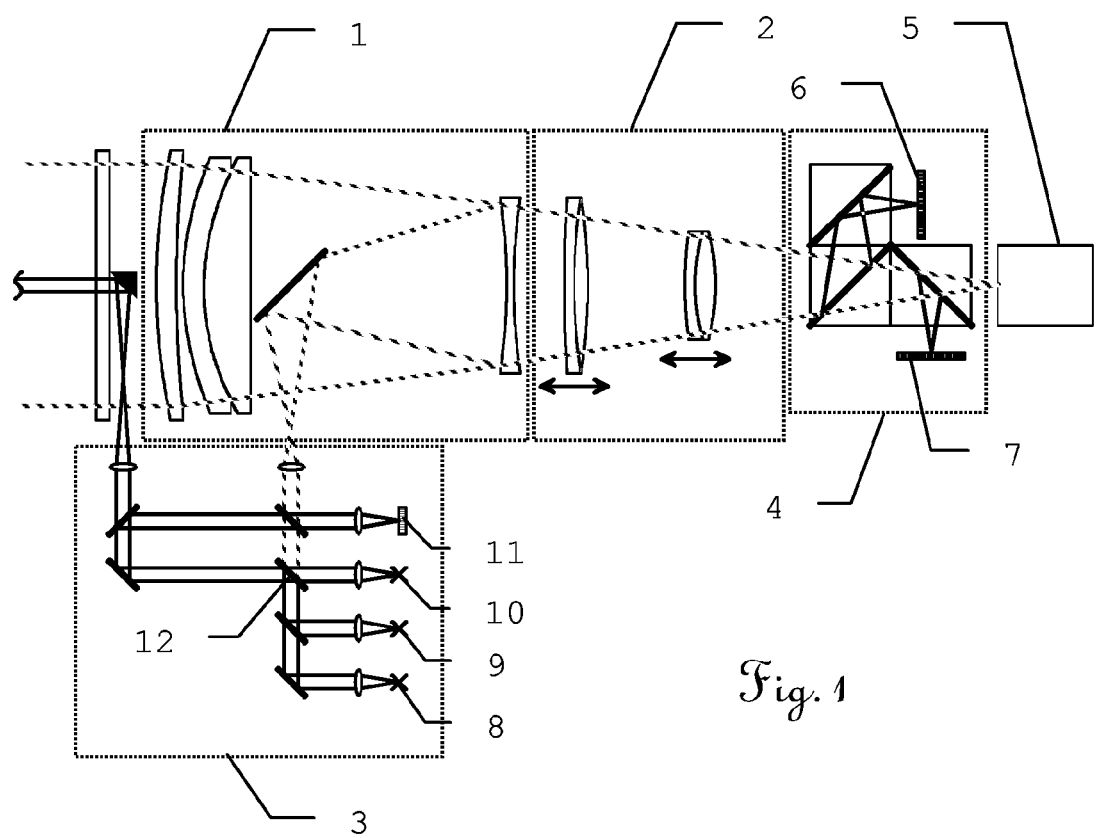
FIG. 1 shows the diagram of the components of a geodetic device according to the invention.

FIG. 1 shows the diagram of the components of a geodetic device according to the invention. The total system consists of the assemblies fore-optics 1, autofocus and zoom group 2, infinite platform 3 and finite platform 4 and optionally an eyepiece unit 6. The infinite platform 3 carries the components transmitter 9 and receiver 10 for a distance measurement to target object, illuminating laser 8 and receiver unit 11, for automatic target recognition. The beam paths of illuminating laser 8, transmitter 9 and receiver 10 can be varied together by a microscanner element 12 so that surveying of the target or automatic target recognition is possible in the area of capture. Target recognition is based here on the increased reflectivity of a cooperative target compared with the background. An improvement, according to the invention, of the control and of the target recognition is permitted by the integration of an RIM sensor array 7 into the finite platform 4. This RIM sensor array 7 makes use of a common beam path with a camera 6. Both components use the autofocus and zoom group 2, after which they are integrated into the beam path. In this working example, camera 6 and RIM sensor array 7 are fixed in position relative to one another so that the distance points to be recorded or the orientations of the distance measurements to points in the area of capture are coordinated in each case with individual image points or image point sets of the camera 6.

In alternative working examples, the assignments to the image points or the geometry of the arrangement of the sensor points of the RIM sensor arrays 7 can be varied. For this purpose, either the RIM sensor array 7 can be moved in the beam path and/or the beam guidance can be changed, for example by the introduction of microlens arrays or holographic elements into the beam path. This introduction is possible, for example, by rotatable support discs or displaceable linear arrangements, which are not shown here.

Figure 2:
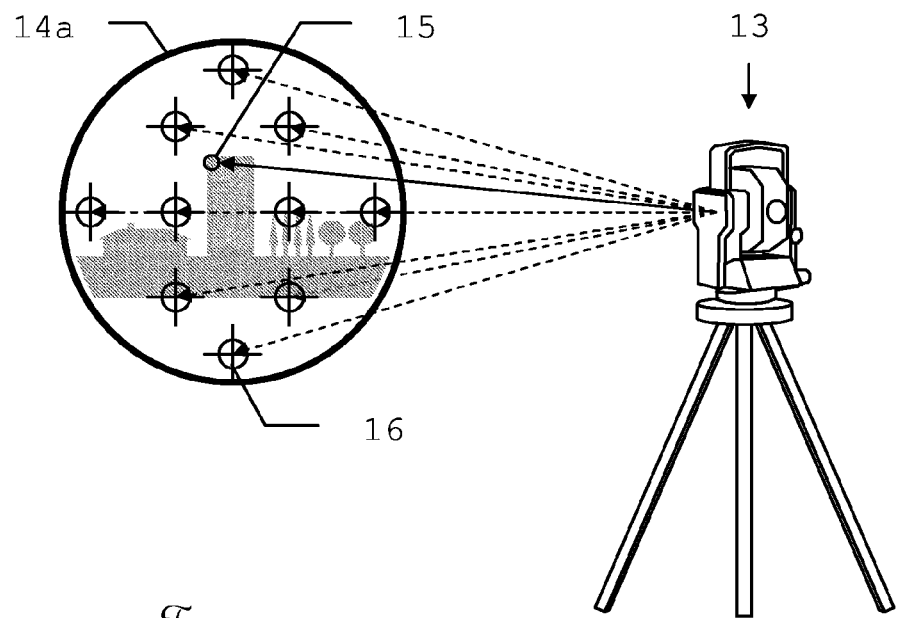
FIG. 2 shows the diagram of a first distribution of distance points to be captured in the area of capture.

FIG. 2 shows the diagram of a first distribution of distance points 16 to be captured in the area 14*a* of capture. By means of a total station as geodetic device 13, a ground section to be surveyed is recorded in the area 14*a* of capture. Within the area 14*a* of capture, angle and distance measurements are made to selected measuring points 15 for the surveying of which the geodetic device 13 is actually used. Parallel to the recording of the area 14*a* of capture by a camera, the distance measurement is made to distance points 16 which, in this example, have a first distribution in a regular pattern, the pattern substantially covering the entire area 14*a* of capture. Such a first distribution can be realised, for example, by a plurality of separate distance-measuring units or by a sensor array with a preliminary optical element for beam guidance or for divergence or alignment of beam axes with the sensor points. A comparatively large area 14*a* of capture can be covered thereby even with only a few sensor points or distance-measuring units. The distance measurement to the distance points 16 is effected simultaneously for at least two distance points 16, but preferably for the entire distribution of the distance points 16 at the same time and in one process. If appropriate, however, a plurality of groups of in each case at least two distance points 16 can also be sequentially recorded, for example if a sensor array having only a few sensors is to be used in order nevertheless to survey a relatively large number of distance points 16. By simultaneous distance measurement to at least two distance points 16, but in particular a plurality of distance points 16 or many distance points 16, it is possible to combine the visual image with distance information in real time. Simultaneity of the measurement means at least the overlapping of the distance measurements to the at least two distance points 16 with respect to time.

If the distance information is provided at a rate which corresponds to the optical recording rate of the visual image or to the user interaction with the use of the visual image, there is no undesired retardation of this visually controlled process. This is the case in particular if distance measurement to the distance points 16 and capture of the visual image are effected simultaneously, the simultaneity—in addition to a physical simultaneity—being determined by the rate of capture of the visual image or the user actions which thus determine the resolution required with respect to time.

A simultaneity prevents any possible deviations and differences between the orientation in the distance measurement to the distance points 16 and the capture of the visual image. These two processes can therefore advantageously be carried out simultaneously and in particular with the use of an at least partly common beam path or jointly used components. This synchronous or simultaneous recording of distance measurements and visual image ensures linkability of the two methods of measurement owing to the cohesion with respect to time, so that, for control of the application processes, distance information can additionally be used for identification of structures in the visual image. The simultaneity permits delay-free implementation of the process controlled via the visual image, which will not be realizable in this manner, for example, in recording of distance measurements with scanning of points.

FIG. 3*a-d* show examples of further distributions of the distance points to be captured in the area of capture. In these FIG. 3*a-d*, as also in FIG. 2, only a few distance points to be captured are shown purely by way of example. The number of points to be used or of coordinated sensor points or distance-measuring units can, however, be substantially larger, e.g. $32^2=1024$, or even smaller.

Figures 3A, 3B, 3C, 3D:
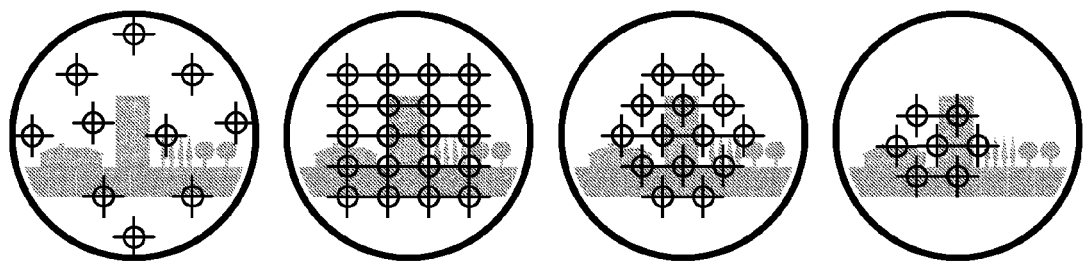
FIG. 3a-d show the diagram of further distributions of distance points to be captured in the area of capture.

FIG. 3*a* shows a statistical or random distribution of the distance points in the area of capture.

FIG. 3*b* shows the case of a regular pattern with equidistant rows and columns, as realised, for example, in RIM sensor arrays. This pattern for the most part fills the area of capture uniformly.

Another, hexagonal arrangement of the distance points is shown in FIG. 3*c*. This pattern approximates a circular area better than rectangular shapes. Here, a concentration of the distance points in the generally most intensively used centre of the area of capture is shown. If the dimensions of the hexagon are chosen to be larger the pattern fills the area of capture more uniformly than in FIG. 3*d*.

Finally, FIG. 3*d* shows a pattern which can be moved in the area of capture and can be positioned in zones of greater relevance. In this example, the buildings are the target of a survey, whereas the sky or the groups of trees have no relevance for the survey. To increase the resolution, all distance points can now be moved in a part of the area of capture, for example by changing the orientation of the beam axes.

Figure 4:
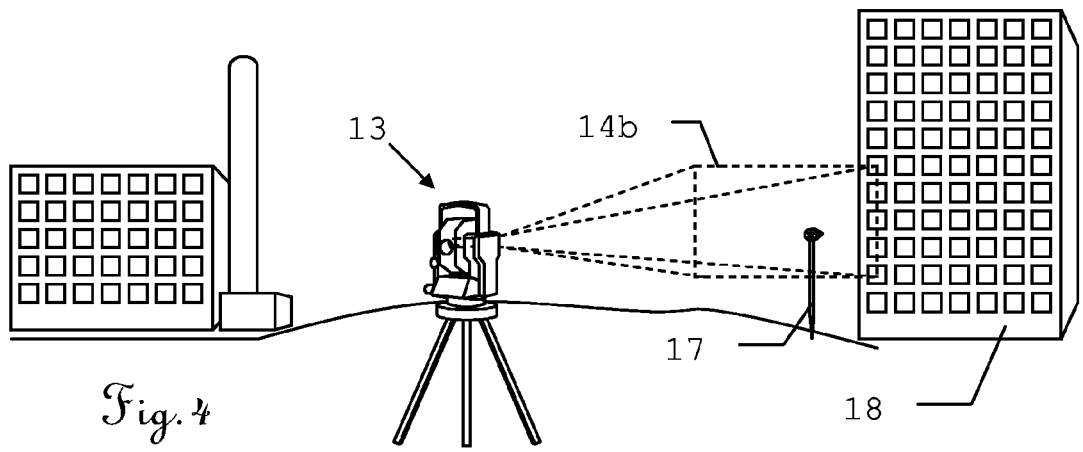
FIG. 4 shows a use example for a method or geodetic device according to the invention.

FIG. 4 explains the method according to the invention or a geodetic device 13 according to the invention on the basis of a use example for automated target recognition. By means of a total station as geodetic device 13, a plumb staff 17 having a reflector as a cooperative target is to be detected and automatically sighted in built-up terrain. A window of a building 18 present in the area 14*b* of capture may result in reflections which may complicate identification of the plumb staff 17 simply on the basis of its high albedo. Similarly disadvantageous configurations may also arise, for example, if the sun is low in the sky or in the case of road traffic with reflective vehicle surfaces. Particularly for non-cooperative targets, automated target recognition cannot be performed under such conditions.

Figure 5:
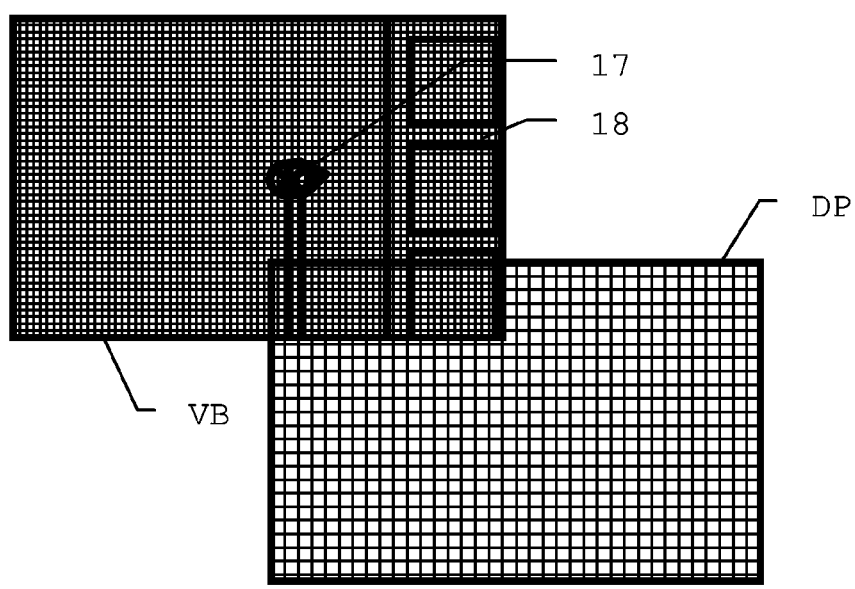
FIG. 5 shows the diagram of visual image and distance image.

For automated detection of the plumb staff 17, the latter is, as shown in FIG. 5, recorded by the camera of the total station in a visual image VB. This visual image VB likewise contains parts of the building 18 with reflective surfaces. The recording of a distance image, the recording sensor array of which is composed of a matrix of sensor points for the measurement of the distance points DP, is effected in parallel with this capture. In this example, the coverage achieved by the matrix of the distance points DP corresponds to the visual image VB and hence to the area of capture of the device, in each case a plurality of image points of the visual image VB being coordinated with each distance point DP.

Figure 6:
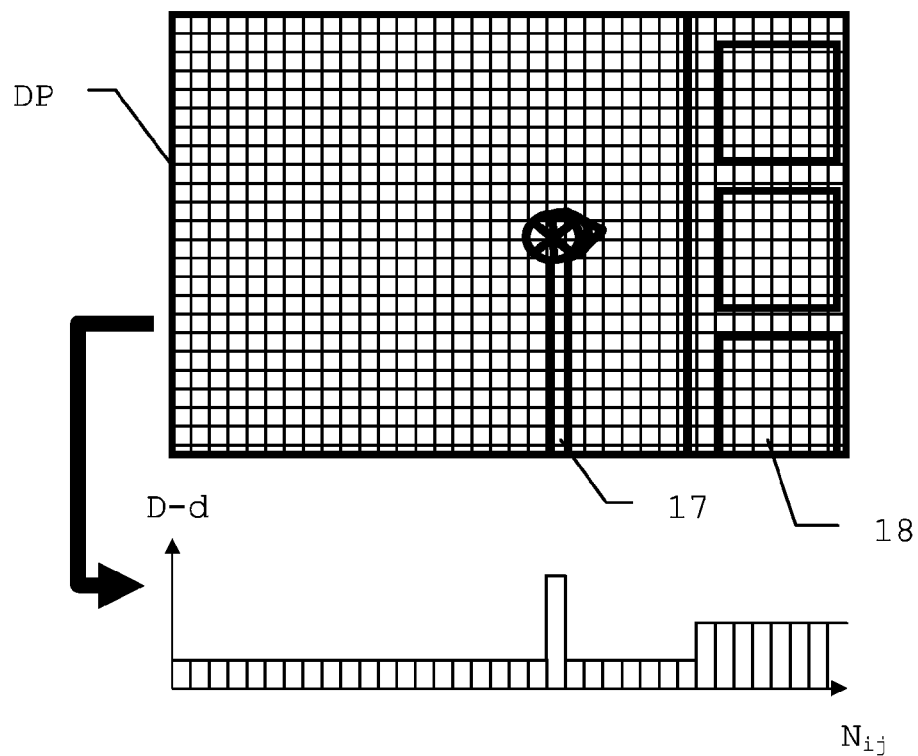
FIG. 6 shows the assignment of visual image and distance measurements to the recording of a distance image and FIG. 7 shows the diagram of an example for a distance image.

By means of the sensor points, the distance points DP are surveyed with the resolution shown in FIG. 6. In FIG. 6, the positions of the plumb staff 17 and of the building 18 are emphasised within the distance points DP in the upper picture. The distances measured for the individual distance points are shown in the lower picture for a row of distance points DP. In this purely exemplary representation the difference between measured distance d and an assumed maximum distance D is plotted. For non-determinable distance values, e.g. in measurements towards the sky, for example, a predetermined value can be taken as a place-holder value. For each of the pixels $N_{ij}$, the associated value for D-d is given, resulting in a distance profile in which the plumb staff 17 and the building 18 can be identified as structures in the area of capture.

Figure 7:
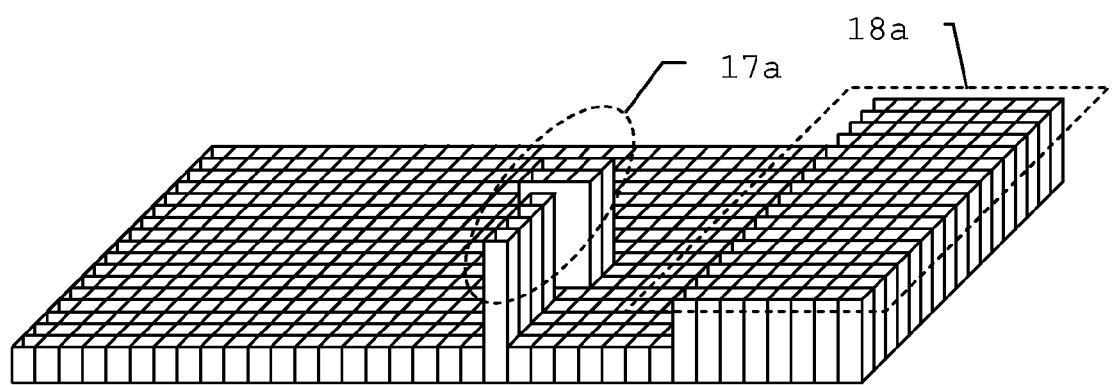

FIG. 7 shows the diagram of the distance image recorded according to FIG. 6, as an example for the identification of structures and the assignment of image points. The matrix of the distance points with the respective distance values D-d is shown. In this matrix, it is possible to identify cohesive regions of distance values which can be coordinated with the structures of the visual image. Thus, in the distance image, a first region can be identified as an image 17*a* of the plumb staff, and a second region 18*a* as an image of the building. The identification and assignment of the regions to objects in the visual image can be effected, for example, by known image processing methods. In principle, structures can be identified here separately in each case for visual image and distance image, which structures are combined in a subsequent step or direct assignments of image and distance points can be made—without separate structure recognition in the two images—from the aggregate of which the objects or structures are identified.

The embodiments and figures shown represent only explanatory examples for realisations according to the invention and are therefore not to be understood as being definitive and limiting. In particular, the numbers of the image points and distance points shown have been chosen merely for reasons of representation.

What is claimed is:

1. A method for surveying at least one target by a geodetic device, comprising:
   capturing a visual image of an area by a camera of the device, the camera obtaining a multiplicity of image points;
   performing a geodetic angle and/or distance measurement to the target, the angle and/or distance measurement being supported or controlled by means of the visual image; and
   simultaneously recording distance values of a multitude of discrete distance points for the provision of a distance image as a spatial distribution of discrete distance points in the area of capture, wherein the number of distance points is smaller than the number of image points, wherein:
      the at least one image point is coordinated with at least one distance point; and
      an orientation of the distance measurements in the area of capture is varied, as a function of measured distance values, in particular as a function of the distribution of the distance values.

2. A method according to claim 1, wherein the orientation of the distance measurements in the area of capture takes place according to a stochastic pattern.

3. A method according to claim 1, wherein the orientation of the distance measurements in the area of capture takes place according to a regular pattern.

4. A method according to claim 1, wherein cohesive regions of distance points are identified in the distance image.

5. A method according to claim 1, wherein the visual image and the distance image are superposed.

6. A method according to claim 4, wherein, in the visual image objects are identified on the basis of a correlation of cohesive regions and features of the visual image.

7. A method according to claim 1, wherein the spatial position of an object, in particular of the target, in the area of capture is derived from the distance image.

8. A method according to claim 1, wherein the spatial sequence of a plurality of objects in the area of capture is derived from the distance image.

9. A method according to claim 1, wherein an identification of an object, in particular target recognition, is affected on the basis of the distance image.

10. A geodetic device for carrying out the method according to claim 1, comprising at least:
    a camera for capturing a visual image of an area of capture, the camera obtaining a multiplicity of image points;
    an angle- and/or distance-measuring component;
    a control unit for controlling the angle and/or distance-measuring component; and
    means for simultaneous recording of distance values of a multitude of discrete distance points and providing a distance image as spatial distribution of discrete distance points in the area of capture, wherein the number of distance points is smaller than the number of image points.

11. A geodetic device according to claim 10, wherein the number of distance points recorded by the means for recording a distance image is smaller than the number of image points, at least one image point being coordinated with at least one distance point.

12. A geodetic device according to claim 10, further comprising a focusing member in a beam path to the camera, the means for recording a distance image being a range imaging module sensors array and/or being arranged after the focusing member in the beam path.

13. A geodetic device according to claim 12, further comprising means which can be introduced into the beam path, in particular in conjunction with a rotatable or displaceable support element, for orientation of the distance measurements in the area of capture, in particular having microlenses or holographic elements.

14. A non-transitory computer program product having program code which is stored on a machine-readable medium for carrying out the method according to claim 1.

15. A method according to claim 5, wherein, in the visual image objects are identified on the basis of a correlation of cohesive regions and features of the visual image.

16. A geodetic device according to claim 11, further comprising a focusing member in a beam path to the camera, the means for recording a distance image being arranged after the focusing member in the beam path.

17. A method according to claim 1, wherein the simultaneous recording of the at least two discrete points for the provision of a distance image as a spatial distribution of the discrete distance points in the area of capture is performed simultaneously with the capture of the visual image.

18. A method for surveying at least one target by a geodetic device, comprising:
    capturing a visual image of an area by a camera of the device, the camera obtaining a multiplicity of image points;
    performing a geodetic angle and/or distance measurement to the target, the angle and/or distance measurement being supported or controlled by means of the visual image; and simultaneously recording distance values of a multitude of discrete distance points for the provision of a distance image as a spatial distribution of discrete distance points in the area of capture, wherein:

the number of distance points is smaller than the number of image points; and an orientation of the distance measurements in the area of capture is varied as a function of measured distance values as a function of the distribution of the distance values.

19. A geodetic device according to claim 10, wherein the geodetic device is a tacheometer, the camera is a CCD or CMOS camera and the control unit controls the angle and/or distance-measuring component by means of the visual image.

* * * * *